Sept. 6, 1955     A. BLUMSTEIN     2,716,849
GRINDING AND CLEANING DEVICE
Filed Jan. 27, 1955
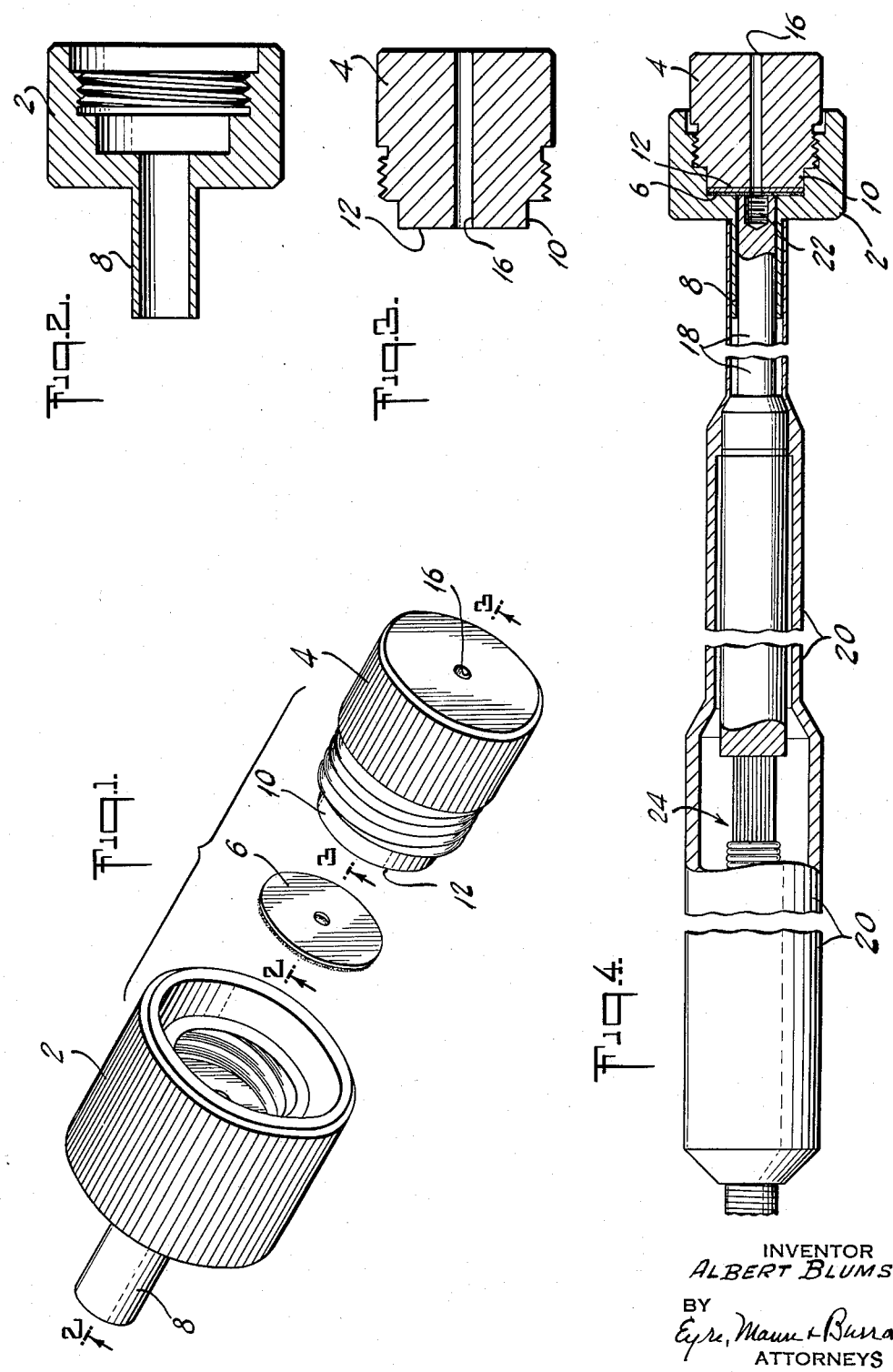
INVENTOR
ALBERT BLUMSTEIN
BY
Eyre, Mann & Burrows
ATTORNEYS United States Patent Office 2,716,849
Patented Sept. 6, 1955

2,716,849

GRINDING AND CLEANING DEVICE

Albert Blumstein, Bronx, N. Y., assignor to Cavitron Corporation, a corporation of New York Application January 27, 1955, Serial No. 484,343

6 Claims. (Cl. 51—187)

The present invention relates to surface grinding devices and comprises a novel hand operated device of this type particularly designed for use with sonic and ultrasonic dental instruments.

In sonic or ultrasonic cutting, as described in U. S. Patent No. 2,580,716, issued January 1, 1952, to Lewis Balamuth, relatively hard and tough materials are cut by liquid carried abrasive particles to which high accelerations have been imparted by a vibrating tool end. High frequency longitudinal vibrations are set up in the tool by means of an electro-magnetic transducer, for example, a magneto-strictive transducer, maximum amplitude of vibration occurring preferably at the work end of the tool. The tool end is urged against the work and cutting of the work by the abrasive particles continues with advance of the tool into the cavity formed in the work.

In dental equipment employing the above briefly described cutting process, the transducer and a combined acoustical impedance transformer and tool holder are secured together and positioned within a casing adapted to be carried in the hand of the dentist. As different shaped tool bits are advisable for different dental cutting operations, means are provided for detachably securing such bits to the end of the tool holder remote from the transducer. Such means preferably comprise a threaded stud on one end of each bit and an axial threaded aperture in the end of the tool holder. To insure maximum transmission of vibration from the tool holder to the tool bit, the annular end surface of the tool holder should be flush with the annular surface of the bit when the stud thereof is threaded into the mating aperture of the holder. Care is therefore taken in machining these surfaces of original equipment to insure that they are planar and truly perpendicular, respectively, to the axis of the holder and to the axis of the stud.

During use of the equipment the junction of tool holder and bit becomes subjected to the abrasive slurry used in the cutting process. Consequently the abrasive particles of the slurry tend to ride over and wear the mating annular surfaces during removal and replacement of a tool bit. Damage to the surface of the tool bit is relatively unimportant as the expected useful life of the tool bit due to wear of the cutting end thereof is relatively short. The tool holder is, however, a permanent part of the equipment and hence it is important that the end surface be maintained smooth and perpendicular to the tool holder axis.

The grinding device of the present invention provides means, readily operable by the dentist, for rapidly and simply cleaning and regrinding the end surface of the tool holder to maintain the equipment in optimum condition. The new device comprises a cylindrical internally threaded cup member and a cooperating cylindrical stud member externally threaded over a portion of its length. The cup member has an axial tubular extension formed integral therewith of an internal diameter such as to have sliding fit over the end of the tool holders to be ground. The stud member is provided with a small axial passage therethrough for a purpose hereinafter to be described, and is machined at the end thereof which is disposed within the cup member when the parts are screwed together, to provide a smooth surface accurately perpendicular to the axes of the stud and of the tubular extension of the cup member. A centrally apertured abrasive disc which, when the members are assembled together, is held between the machined plane surface of the stud member and the base of the cup, completes the device. Preferably the outer surface of the cup member and the unthreaded portion of the stud member are knurled to provide good gripping surfaces.

For a better understanding of the invention reference may be had to the accompanying drawing of which:

Fig. 1 is an isometric exploded view of a grinding device embodying the invention;

Fig. 2 is a longitudinal sectional view through the cup member of Fig. 1;

Fig. 3 is a longitudinal sectional view through the stud member of Fig. 1; and

Fig. 4 is a view partly in section showing the assembled grinding device of the invention held in operative position for cleaning and grinding the annular end surface of an ultrasonic dental tool holder.

The new grinding device comprises the metal cup member 2 and metal stud member 4 which when assembled together hold therebetween an abrasive disc 6. The cup member 2, which is internally threaded for a portion of its length, is provided with a tubular extension 8 disposed on the extended axis of the member and having an internal diameter such as to have a sliding fit about the cylindrical end of the ultrasonic dental tool holder with which the device is to be used. The stud member 4 over about one half the length thereof is externally threaded with threads adapted to mate with the internal threads of the cup member 2. Over the remainder of the stud member the surface is knurled to provide a good hand gripping portion. The threaded end of the stud member is provided with a short cylindrical section 10 having a machined plane surface 12 on the end thereof accurately perpendicular to the axis of the stud member. The base of the cup member 2 is recessed to receive the cylindrical end 10 of the stud member. The abrasive disc 6 which is circular in shape and of a diameter equal to that of the cylindrical end 10 of the stud member seats in the cylindrical recess in the cup member and is engaged by the machined surface 12 of the stud 4 when the parts are assembled, the abrasive surface of the disc 6 facing the open end of the tubular extension 8. The disc 6 has a small central aperture which, when the parts are assembled is aligned with an axial passage 16 extending through the stud member 4.

In operation, as shown in Fig. 4 the tubular extension 8 is slid over the end of the tool holder 18, telescoping into the space between the casing 20 of the tool holder and the tool holder itself. The annular end of the tool holder surrounding the threaded aperture 22 thereof is thus brought into engagement with the abrasive coating of the disc 6. The assembled device is then manipulated by the operator by grasping the outer surface of the cup 2, which surface is also preferably knurled as shown in the drawing, to rotate the disc 6 against the end of the tool holder. As the disc 6 is held firmly in contact with the machined surface 12 and as that surface is truly perpendicular to the axis of the stud member, and, when the parts are assembled, truly perpendicular to the axis of the tubular extension 8, the engaging surface of the tool holder will be cleaned and ground perpendicular to the axis of the tool holder. Any abrasive particles left on the holder from the slurry or removed from the disc 6 during the polishing and grinding operation drop out from the device through the hole in the disc and communicating passage 16 in the stud member 4. Being hand manipulatable and constructed to conform with the tool holder the surface of which is to be cleaned or ground, the dentist can rapidly refinish the tool holder surface prior to attachment of a new tool bit to the tool holder and at the same time remove any of the abrasive slurry which may have caked upon the tool holder.

In Fig. 4 the hand unit of an ultrasonic dental equipment with which the new grinding device is intended for use is diagrammatically indicated as comprising a magnetostrictive transducer 24 mounted within the enlarged end of casing 20 and the combined acoustical impedance transformer and tool holder 18 secured at one end to the transducer 24 and provided at its other end with the threaded axial aperture 22 for reception of a tool bit. It will be understood that the winding of the transducer 24 is connected to a suitable source (not shown) of high frequency electrical oscillations and of D. C. bias current. Preferably also, means (not shown) are provided for cooling the transducer. As the present invention is not concerned with any specific design of ultrasonic dental equipment, further description thereof is not deemed necessary.

From the foregoing description it will be apparent that the invention provides a novel and useful device for maintaining ultrasonic dental equipment in optimum working condition so far as concerns transmission of vibrations from a tool holder to a tool bit and that the device, although simple of construction, is a valuable and important adjunct to such equipment.

The following is claimed:

1. A device for cleaning and truing the transverse end surface of a cylindrical member which comprises a cylindrical cup member having an axially disposed tubular extension formed integral therewith and of an internal diameter dimensioned for sliding fit on the cylindrical member the end surface of which is to be cleaned and trued, the internal walls of said cup member being provided with screw threads terminating short of the base of the cup and the base of the cup being formed with a cylindrical recess, a centrally apertured abrasive disc of a diameter to fit within said recess, and a cooperating stud member externally threaded to screw into the cup of said cup member, said stud member having a cylindrical end with a true transverse end surface adapted to provide a backing for said disc when the member the end of which is to be cleaned and trued is inserted into the tubular extension of said cup member, said stud member having an axial passage therethrough whereby particles removed from the surface to be cleaned or from the disc may fall from the device through the aperture in said disc and passage in said stud member.

2. A manually operable grinding and cleaning device comprising cylindrical cup and stud members adapted to be detachably secured together with one end of said stud member penetrating said cup member, said cup member having an axial tubular extension for reception of a cylindrical element the end surface of which is to be cleaned and trued, said stud member having an axial passage therethrough, one end of said stud member having a plane surface perpendicular to the axis of said tubular extension when the members are attached together, said end surface serving as a support for a centrally apertured abrasive disc interposed between the base of the cup member and said end surface for engagement by the end of any cylindrical element inserted into said tubular extension.

3. A manually operable device for cleaning and maintaining the end surface of an ultrasonic dental tool holder perpendicular to the axis thereof comprising a cylindrical cup member having an axially disposed tubular extension of an internal diameter sufficient to accommodate the cylindrical end of a dental tool holder and a stud member having a transverse plane surface at one end thereof, said stud member being screw threadable into said cup member to bring said transverse plane surface adjacent the inner end of said tubular extension and to hold therebetween an abrasive disc for grinding engagement with the end surface of a tool holder when inserted into said tubular extension.

4. The device according to claim 3 wherein said stud member is provided with an axial passage and said abrasive disc is centrally apertured, whereby abrasive particles may fall from the device through said aperture and passage.

5. The device according to claim 4 wherein the outer surface of said cup member is roughened to provide a non-slip gripping surface for manipulation of the device.

6. The device according to claim 3 wherein the screw threads in said cup member terminate short of the base of the cup and the base is formed with a smooth walled cylindrical recess for reception of the abrasive disc and wherein the end of said stud member having said plane surface is cylindrical to project into said recess and engage the side walls thereof when the members are threaded together.

References Cited in the file of this patent

UNITED STATES PATENTS

| 965,444 | Dahl | July 26, 1910 |
| 1,334,224 | Campbell | Mar. 16, 1920 |
| 1,679,605 | Evans | Aug. 7, 1928 |
| 2,479,726 | Czarnota | Aug. 23, 1949 |